US012800504B2

(12) United States Patent
Iguchi et al.

(10) Patent No.: US 12,800,504 B2
(45) Date of Patent: Nov. 17, 2026

(54) SPECTROSCOPIC DEVICE, RAMAN SPECTROSCOPIC MEASUREMENT DEVICE, AND SPECTROSCOPIC METHOD

(71) Applicant: HAMAMATSU PHOTONICS K.K., Hamamatsu (JP)

(72) Inventors: Kazuya Iguchi, Hamamatsu (JP); Hideki Masuoka, Hamamatsu (JP); Kenichi Ohtsuka, Hamamatsu (JP); Kunihiko Tsuchiya, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 138 days.

(21) Appl. No.: 18/855,467

(22) PCT Filed: Dec. 19, 2022

(86) PCT No.: PCT/JP2022/046730
§ 371 (c)(1),
(2) Date: Oct. 9, 2024

(87) PCT Pub. No.: WO2023/228453
PCT Pub. Date: Nov. 30, 2023

(65) Prior Publication Data

US 2025/0341469 A1 Nov. 6, 2025

(30) Foreign Application Priority Data

May 27, 2022 (JP) ................................ 2022-086948

(51) Int. Cl.

| | |
|---|---|
| ***G01N 21/65*** | (2006.01) |
| ***H04N 25/616*** | (2023.01) |
| ***H04N 25/78*** | (2023.01) |

(52) U.S. Cl.
CPC .......... *G01N 21/65* (2013.01); *H04N 25/616* (2023.01); *H04N 25/78* (2023.01)

(58) Field of Classification Search
CPC ...... G01N 21/65; H04N 25/616; H04N 25/78; G01J 3/0297; G01J 3/2803; G01J 3/44; G01J 3/36
See application file for complete search history.

(56) References Cited

U.S. PATENT DOCUMENTS

2007/0165222 A1* 7/2007 Bouzid ................ G01J 3/2803 356/328
2012/0257196 A1 10/2012 Raicu et al.
(Continued)

FOREIGN PATENT DOCUMENTS

CN 111750991 A 10/2020
CN 114127520 A 3/2022
(Continued)

OTHER PUBLICATIONS

International Preliminary Report on Patentability mailed Dec. 12, 2024 for PCT/JP2022/046730.

*Primary Examiner* — Monica T Taba
(74) *Attorney, Agent, or Firm* — Faegre Drinker Biddle & Reath LLP

(57) ABSTRACT

A spectroscopic device receives light wavelength-resolved in a predetermined direction by a spectroscopic optical system including a spectroscopic element to output spectroscopic spectrum data of the light, and the spectroscopic device includes a CMOS image sensor including a pixel unit including a plurality of pixels receiving the wavelength-resolved light to convert the light into an electrical signal, and the plurality of pixels being arranged in a row direction along a wavelength resolution direction and in a column direction perpendicular to the row direction, a specifying unit specifying, as a specific pixel, the pixel on which a spectroscopic spectrum image of the light is formed among the plurality of pixels, and a generation unit integrating pixel
(Continued)

values of the specific pixels belonging to the same column to generate spectroscopic spectrum data based on an integration result.

13 Claims, 12 Drawing Sheets

(56) References Cited

U.S. PATENT DOCUMENTS

| | | | | |
|---|---|---|---|---|
| 2014/0268136 | A1 | 9/2014 | Pawluczyk et al. | |
| 2020/0374478 | A1 * | 11/2020 | Maruno | G01J 1/44 |
| 2022/0397532 | A1 * | 12/2022 | Yonetani | G01J 3/44 |

FOREIGN PATENT DOCUMENTS

| | | | | | |
|---|---|---|---|---|---|
| JP | 2016-180732 | A | | 10/2016 | |
| JP | 2020118477 | A | * | 8/2020 | G01N 21/64 |
| JP | 2021-139887 | A | | 9/2021 | |
| TW | 201928310 | A | | 7/2019 | |
| WO | 2021/172274 | A1 | | 9/2021 | |

* cited by examiner

SPECTROSCOPIC DEVICE, RAMAN SPECTROSCOPIC MEASUREMENT DEVICE, AND SPECTROSCOPIC METHOD

TECHNICAL FIELD

The present disclosure relates to a spectroscopic device, a Raman spectroscopic measurement device, and a spectroscopic method.

BACKGROUND ART

As a conventional spectroscopic device, for example, a spectroscopic device described in Patent Literature 1 is mentioned. This conventional spectroscopic device is a so-called Raman spectroscopic device. The spectroscopic device includes a means for linearly irradiating excitation light, a movable stage on which a sample is placed, an objective lens focusing Raman light from an excitation light irradiation region, a slit provided at an image forming position of the Raman light, a spectroscope dispersing light passing through the slit, a CCD detector detecting a Raman spectrum image, and a control device controlling mapping measurement by synchronization between the movable stage and the CCD detector.

CITATION LIST

Patent Literature

Patent Literature 1: Japanese Unexamined Patent Publication No. 2016-180732

SUMMARY OF INVENTION

Technical Problem

In the field of spectroscopic measurement such as Raman spectroscopy, fluorescence spectroscopy, and plasma spectroscopy, vertical binning of a CCD image sensor is used to acquire spectroscopic spectrum data in order to improve an SN ratio of a signal. In the vertical binning in the CCD image sensor, charges generated in each pixel are added for a plurality of stages. In the CCD image sensor, readout noise is generated only in an amplifier of the final stage, and does not increase in the process of vertical binning. Therefore, as the number of stages of vertical binning increases, the SN ratio of the signal can be improved.

As the image sensor, in addition to CCD, a CMOS image sensor is also known. However, at present, CMOS image sensors are not widely used in the field of spectroscopic measurement. In the CMOS image sensor, an amplifier is arranged in each pixel, and a charge is converted into a voltage for each pixel. In the case of performing vertical binning by a conventional CMOS image sensor, since readout noise is also integrated as the number of stages of vertical binning increases, there is a problem in that an SN ratio of a signal is lower than that in the case of using a CCD image sensor.

The present disclosure has been made to solve the above problems, and an object thereof is to provide a spectroscopic device, a Raman spectroscopic measurement device, and a spectroscopic method capable of acquiring spectroscopic spectrum data with an excellent SN ratio.

Solution to Problem

The gist of a spectroscopic device, a Raman spectroscopic measurement device, and a spectroscopic method according to an aspect of the present disclosure is as described in the following [1] to [14].

[1] A spectroscopic device receiving light wavelength-resolved in a predetermined direction by a spectroscopic optical system including a spectroscopic element to acquire spectroscopic spectrum data of the light, the spectroscopic device including: a CMOS image sensor including a pixel unit including a plurality of pixels receiving the wavelength-resolved light to convert the light into an electrical signal, and the plurality of pixels being arranged in a row direction along a wavelength resolution direction and in a column direction perpendicular to the row direction; a specifying unit specifying, as a specific pixel, a pixel on which a spectroscopic spectrum image of the light is formed among the plurality of pixels; and a generation unit integrating pixel values of the specific pixels belonging to the same column to generate spectroscopic spectrum data based on an integration result.

In this spectroscopic device, a pixel on which a spectroscopic spectrum image of the wavelength-resolved light is formed is specified as a specific pixel, and pixel values of the specific pixels belonging to the same column are integrated to generate spectroscopic spectrum data. By excluding other pixels on which the spectroscopic spectrum image is not formed from the integration of the pixel values, the influence of the readout noise when the pixel values are integrated can be sufficiently reduced. Therefore, in this spectroscopic device, the spectroscopic spectrum data can be acquired with an excellent SN ratio.

[2] The spectroscopic device described in [1], wherein the specifying unit excludes a pixel whose readout noise exceeds a threshold from the specific pixel. Thereby, the influence of the readout noise when the pixel values are integrated can be more sufficiently reduced. Therefore, the SN ratio of the spectroscopic spectrum data can be further improved.

[3] The spectroscopic device described in [1] or [2], wherein the threshold of the readout noise is set in a range of 0.1 [$e^{-}$rms] or more and 1.0 [$e^{-}$rms] or less. By setting such a threshold, the influence of the readout noise when the pixel values are integrated can be more sufficiently reduced. Therefore, the SN ratio of the spectroscopic spectrum data can be further improved.

[4] The spectroscopic device described in any one of [1] to [3], wherein the specifying unit specifies, as the specific pixel, a pixel whose imaging area of the spectroscopic spectrum image is 50% or more of an area of a light receiving surface. In this case, by excluding a pixel having a small contribution to acquisition of the spectroscopic spectrum image from the specific pixel, the influence of the readout noise when the pixel values are integrated can be more sufficiently reduced. Therefore, the SN ratio of the spectroscopic spectrum data can be further improved.

[5] The spectroscopic device described in any one of [1] to [3], wherein the specifying unit specifies an integration ratio of the specific pixels on the basis of aberration information of the light, and the generation unit integrates the pixel values of the specific pixels by using the integration ratio. According to such a configuration, even when distortion due to aberration occurs in the spectrum image of the wavelength-resolved light, spectroscopic spectrum data with a favorable SN ratio can be acquired.

[6] The spectroscopic device described in any one of [1] to [5], wherein the pixel unit includes: a first pixel region and a second pixel region divided in the column direction; a first readout unit reading each pixel belonging to the first pixel region; and a second readout unit reading each pixel belonging to the second pixel region. In this case, the first pixel region and the second pixel region can be selectively used according to the mode of the spectroscopic spectrum image. Therefore, spectroscopic spectrum data of various types of light can be acquired with a favorable SN ratio.

[7] The spectroscopic device described in [6], wherein a first exposure time of each pixel belonging to the first pixel region is shorter than a second exposure time of each pixel belonging to the second pixel region. According to this configuration, for example, spectroscopic spectrum images of light having different intensities depending on wavelengths can be acquired in different exposure times in the first pixel region and the second pixel region. By combining a saturation wavelength band of spectroscopic spectrum data acquired with a short exposure time in the first pixel region and a non-saturation wavelength band of spectroscopic spectrum data acquired with a long exposure time in the second pixel region, spectroscopic spectrum data with a favorable SN ratio can be acquired in a high dynamic range.

[8] The spectroscopic device described in [7], wherein image data of a plurality of frames is acquired in the first pixel region during a period in which image data of one frame is acquired in the second pixel region. In this case, even in the case of setting different exposure times for the first pixel region and the second pixel region, the readout noise of the specific pixels in each column can be made uniform between the first pixel region and the second pixel region. Therefore, the SN ratio of the spectroscopic spectrum data can be stably improved.

[9] The spectroscopic device described in [6], wherein a saturation charge amount of each pixel belonging to the first pixel region and a saturation charge amount of each pixel belonging to the second pixel region are different from each other. In this case, spectroscopic spectrum data with a favorable SN ratio can be acquired in a high dynamic range while the exposure time of each pixel belonging to the first pixel region and the exposure time of each pixel belonging to the second pixel region are kept equal to each other.

[10] The spectroscopic device described in [9], wherein the pixel unit includes a mask making a light receiving area of the first pixel region equal to a light receiving area of the second pixel region. When it is desired to increase a difference between the saturation charge amount of the first pixel region and the saturation charge amount of the second pixel region in order to expand the dynamic range, it is conceivable that a size difference between the light receiving area of the first pixel region and the light receiving area of the second pixel region increases due to the configuration of an imaging sensor. On the other hand, by using the mask making a light receiving area of the first pixel region equal to a light receiving area of the second pixel region, it is possible to equalize the amount of light received per unit time between the first pixel region and the second pixel region. Thereby, spectroscopic spectrum data with a favorable SN ratio can be acquired in a higher dynamic range while the exposure time of each pixel belonging to the first pixel region and the exposure time of each pixel belonging to the second pixel region are kept equal to each other.

[11] The spectroscopic device described in any one of [1] to [10], further including an analysis unit analyzing the spectroscopic spectrum data. In this case, the spectroscopic device is provided with a spectroscopic spectrum data analysis function, so that convenience is improved.

[12] The spectroscopic device described in any one of [1] to [11], further including the spectroscopic optical system including the spectroscopic element. In this case, the spectroscopic device is provided with a wavelength resolution function of the light, so that convenience is improved.

[13] A Raman spectroscopic measurement device including: the spectroscopic device described in any one of [1] to [12]; a light source unit generating light with which a sample is irradiated; and a light guiding optical system guiding Raman scattered light generated by irradiating the sample with the light to the spectroscopic device.

In this Raman spectroscopic measurement device, a pixel on which a spectroscopic spectrum image of the wavelength-resolved Raman scattered light is formed is specified as a specific pixel, and pixel values of the specific pixels belonging to the same column are integrated to generate spectroscopic spectrum data. By excluding other pixels on which the spectroscopic spectrum image is not formed from the integration of the pixel values, the influence of the readout noise of each pixel when the pixel values are integrated can be sufficiently reduced. Therefore, in this Raman spectroscopic measurement device, spectroscopic spectrum data of the Raman scattered light can be acquired with an excellent SN ratio.

[14] A spectroscopic method of receiving light wavelength-resolved in a predetermined direction to acquire spectroscopic spectrum data of the light, the spectroscopic method including: a light receiving step of receiving, by using a CMOS image sensor, the wavelength-resolved light by a plurality of pixels arranged in a row direction along a wavelength resolution direction and in a column direction perpendicular to the row direction to convert the light into an electrical signal; a specifying step of specifying, as a specific pixel, a pixel on which a spectroscopic spectrum image of the light is formed among the plurality of pixels; and a generating step of integrating pixel values of the specific pixels belonging to the same column to generate spectroscopic spectrum data based on an integration result.

In this spectroscopic method, a pixel on which a spectroscopic spectrum image of the wavelength-resolved light is formed is specified as a specific pixel, and pixel values of the specific pixels belonging to the same column are integrated to generate spectroscopic spectrum data. By excluding other pixels on which the spectroscopic spectrum image is not formed from the integration of the pixel values, the influence of the readout noise of each pixel when the pixel values are integrated can be sufficiently reduced. Therefore, in this spectroscopic method, the spectroscopic spectrum data can be acquired with an excellent SN ratio.

Advantageous Effects of Invention

According to the present disclosure, the spectroscopic spectrum data can be acquired with an excellent SN ratio.

DESCRIPTION OF EMBODIMENTS

Hereinafter, preferred embodiments of a spectroscopic device, a Raman spectroscopic measurement device, and a spectroscopic method according to an aspect of the present disclosure will be described in detail with reference to the drawings.

Figure 1:
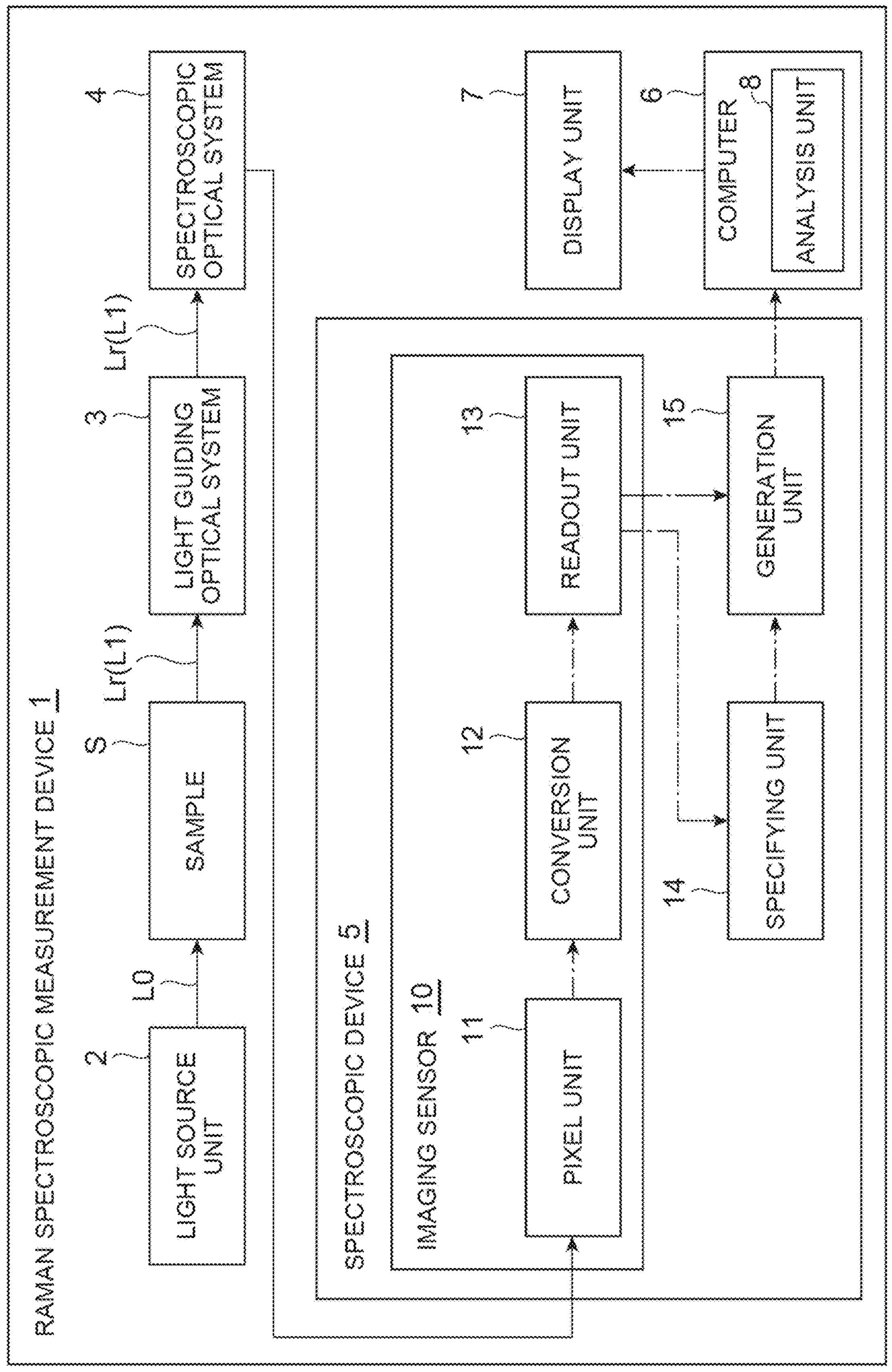
FIG. 1 is a block diagram illustrating a configuration of a Raman spectroscopic measurement device according to an embodiment of the present disclosure.

FIG. 1 is a block diagram illustrating a configuration of a Raman spectroscopic measurement device according to an embodiment of the present disclosure. A Raman spectroscopic measurement device 1 is a device measuring physical properties of a sample S by using Raman scattered light Lr. In the Raman spectroscopic measurement device 1, the sample S is irradiated with light L1 from a light source unit 2, the Raman scattered light Lr generated by an interaction between the light L1 and the sample S is detected by a spectroscopic device 5, and spectroscopic spectrum data of the Raman scattered light Lr is acquired. By analyzing the spectroscopic spectrum data acquired by the spectroscopic device 5 with a computer 6, various physical properties such as the molecular structure, crystallinity, orientation, and distortion amount of the sample S can be evaluated. Examples of the sample S include semiconductor materials, polymers, cells, and pharmaceuticals.

As illustrated in FIG. 1, the Raman spectroscopic measurement device 1 includes the light source unit 2, a light guiding optical system 3, a spectroscopic optical system 4, the spectroscopic device 5, the computer 6, and a display unit 7. In the following description, for convenience, light incident on the spectroscopic device 5 through the spectroscopic optical system 4 may be referred to as the light L1 to be distinguished from the Raman scattered light Lr. In the spectroscopic device 5 incorporated in the Raman spectroscopic measurement device 1, the light L1 refers to the Raman scattered light Lr.

The light source unit 2 is a portion generating light L0 with which the sample S is irradiated. As a light source constituting the light source unit 2, for example, a laser light source serving as an excitation light source for Raman spectroscopy, a light emitting diode, or the like can be used. The light guiding optical system 3 is a portion guiding the Raman scattered light Lr generated by irradiating the sample S with the light L0 to the spectroscopic device 5. The light guiding optical system 3 includes, for example, a collimating lens, one or a plurality of mirrors, a slit, and the like.

The spectroscopic optical system 4 is a portion wavelength-resolving the light L1 in a predetermined direction. The spectroscopic optical system 4 includes a spectroscopic element dispersing the light L1 in a predetermined wavelength resolution direction. As the spectroscopic element, for example, a prism, a diffraction grating (grating), a concave diffraction grating, a crystal spectroscopic element, and the like can be used. The Raman scattered light Lr is dispersed by the spectroscopic optical system 4 and input to the spectroscopic device 5.

In FIG. 1, the spectroscopic optical system 4 is configured separately from the spectroscopic device 5, but the spectroscopic optical system 4 may be incorporated as a constituent element of the spectroscopic device 5. That is, the spectroscopic device 5 may further include the spectroscopic optical system 4 including a spectroscopic element that disperses the light L1 in the wavelength resolution direction. In this case, the spectroscopic device 5 is provided with a wavelength resolution function of the light L1, so that convenience is improved. The spectroscopic device 5 is a portion receiving the light L1 wavelength-resolved in a predetermined direction to output spectroscopic spectrum data of the light L1. In the present embodiment, the spectroscopic device 5 receives the Raman scattered light Lr dispersed in a predetermined wavelength resolution direction by the spectroscopic optical system 4 and outputs spectroscopic spectrum data of the Raman scattered light Lr to the computer 6.

The computer 6 physically includes a storage device such as a RAM or a ROM, a processor (arithmetic circuit) such as a CPU, a communication interface, and the like. As the computer 6, for example, a personal computer, a cloud server, or a smart device (smartphone, tablet terminal, or the like) can be used. The computer 6 is connected to the light source unit 2 of the Raman spectroscopic measurement device 1 and the spectroscopic device 5 so as to be able to communicate information with one another, and can integrally control these constituent elements. The computer 6 also functions as an analysis unit 8 analyzing physical properties of the sample S on the basis of the spectroscopic spectrum data received from the spectroscopic device 5 (generation unit 15). The computer 6 outputs information indicating the analysis result of the analysis unit 8 to the display unit 7.

As illustrated in FIG. 1, the spectroscopic device 5 includes a pixel unit 11, a conversion unit 12, a readout unit 13, a specifying unit 14, and the generation unit 15. The pixel unit 11, the conversion unit 12, and the readout unit 13 are configured by an imaging sensor 10. Examples of the imaging sensor 10 include a complementary metal oxide semiconductor (CMOS) image sensor.

In the present embodiment, the spectroscopic device 5 is configured as a camera including the imaging sensor 10, the specifying unit 14, and the generation unit 15. Here, the spectroscopic device 5 is separated from the computer 6, but the spectroscopic device 5 may be configured to integrally include the camera including the imaging sensor 10, the specifying unit 14, and the generation unit 15, and the computer 6 (analysis unit 8) connected to the camera so as to be able to communicate information with each other electrically or wirelessly. In this case, the spectroscopic device 5 is provided with a spectroscopic spectrum data analysis function, so that convenience is improved.

Figure 2:
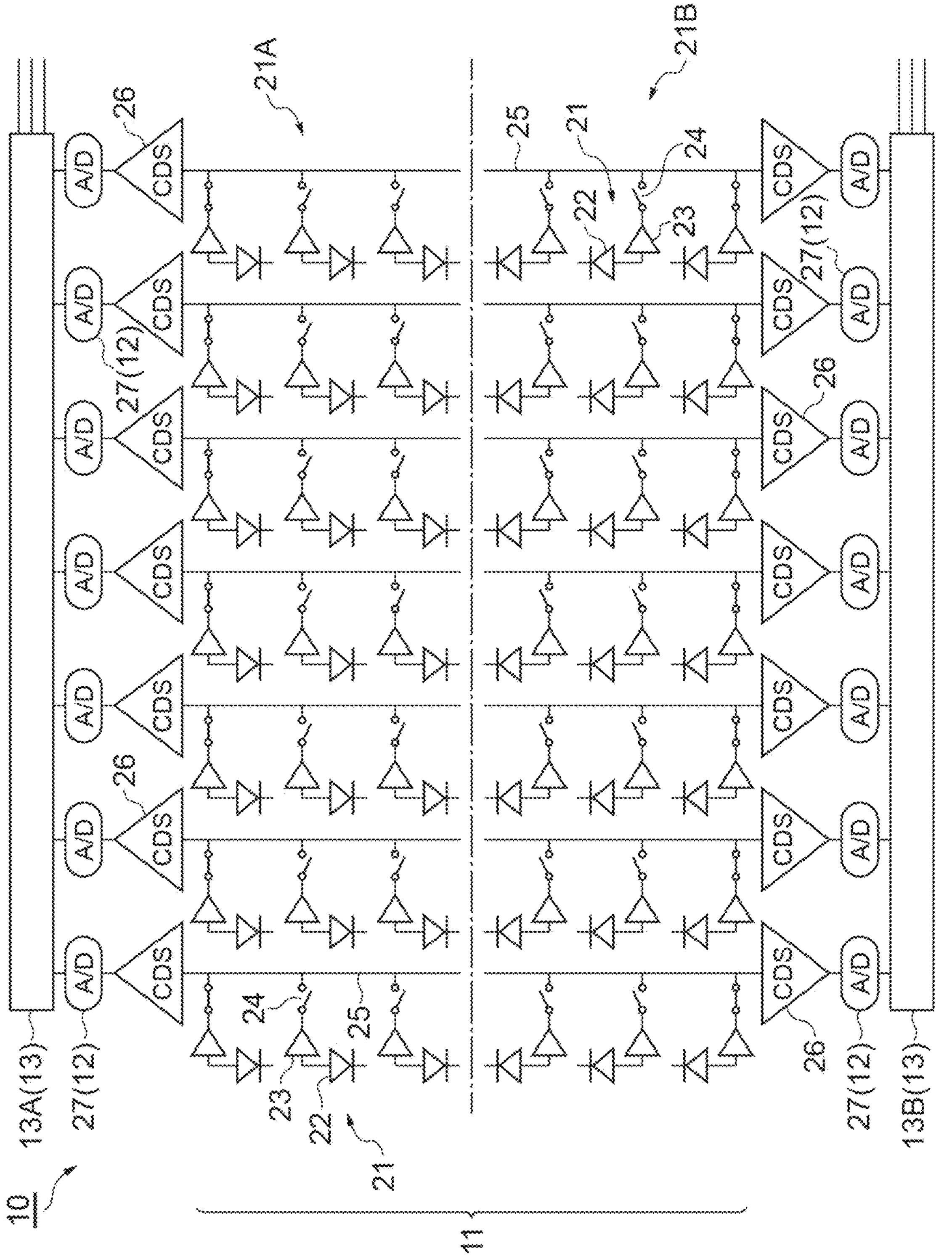
FIG. 2 is a view illustrating an example of a structure of an imaging sensor.

FIG. 2 is a view illustrating a structure of an imaging sensor. As illustrated in FIG. 2, in the pixel unit 11 of the imaging sensor 10, a plurality of pixels 21 arranged in a row direction and a column direction perpendicular to the row direction. Here, the row direction is along the wavelength resolution direction of the light L1 or the Raman scattered light Lr by the spectroscopic optical system 4, and the column direction is along a vertical binning direction described later. In FIG. 2, for convenience of description, the pixels 21 of 6 rows×7 columns are illustrated, but the pixels 21 of n rows×m columns are arranged in the actual pixel unit 11.

Each pixel 21 is a portion capturing a spectrum image of the light L1 or the Raman scattered light Lr formed by the spectroscopic optical system 4. Each pixel 21 includes a photodiode 22 and an amplifier 23. The photodiode 22 accumulates electrons (photoelectrons) generated by the input of the light L1 as charges. The amplifier 23 converts the charges accumulated in the photodiode 22 into an electrical signal (for example, a signal indicating a voltage value) and amplifies the electrical signal.

The electrical signal amplified by the amplifier 23 is transferred to a vertical signal line 25 connecting the pixels 21 in the row direction to each other by switching a selection switch 24 of each pixel 21. A correlated double sampling (CDS) circuit 26 is disposed in each vertical signal line 25. The CDS circuit 26 reduces readout noise between the respective pixels 21 and temporarily stores the electrical signal transferred to the vertical signal line 25.

The conversion unit 12 is a portion converting the voltage value output from the amplifier 23 of each of the plurality of pixels 21 into a digital value. In the present embodiment, the conversion unit 12 includes an A/D converter 27. The A/D converter 27 converts the voltage value stored in the CDS circuit 26 into a digital value. The converted digital value (pixel value) is output to the generation unit 15 via the readout unit 13. The readout unit 13 outputs instruction information instructing the specifying unit 14 to start processing at the time of outputting the pixel value to the generation unit 15.

In the present embodiment, as illustrated in FIG. 2, the pixel unit 11 includes a first pixel region 21A and a second pixel region 21B divided in the column direction, a first readout unit 13A reading each pixel 21 belonging to the first pixel region 21A, and a second readout unit 13B reading each pixel 21 belonging to the second pixel region 21B. In the example of FIG. 2, the first pixel region 21A and the second pixel region 21B are divided at the center in the column direction. That is, the pixel 21 on one side of the center in the column direction belongs to the first pixel region 21A, and the pixel 21 on the other side of the center in the column direction belongs to the second pixel region 21B.

The first readout unit 13A and the second readout unit 13B are arranged independently of each other. The first readout unit 13A is connected to the A/D converter 27 corresponding to the vertical signal line 25 of each pixel 21 belonging to the first pixel region 21A. The first readout unit 13A outputs a pixel value of each pixel 21 belonging to the first pixel region 21A to the generation unit 15. The second readout unit 13B is connected to the A/D converter 27 corresponding to the vertical signal line 25 of each pixel 21 belonging to the second pixel region 21B. The second readout unit 13B outputs a pixel value of each pixel 21 belonging to the second pixel region 21B to the generation unit 15.

Figure 3:
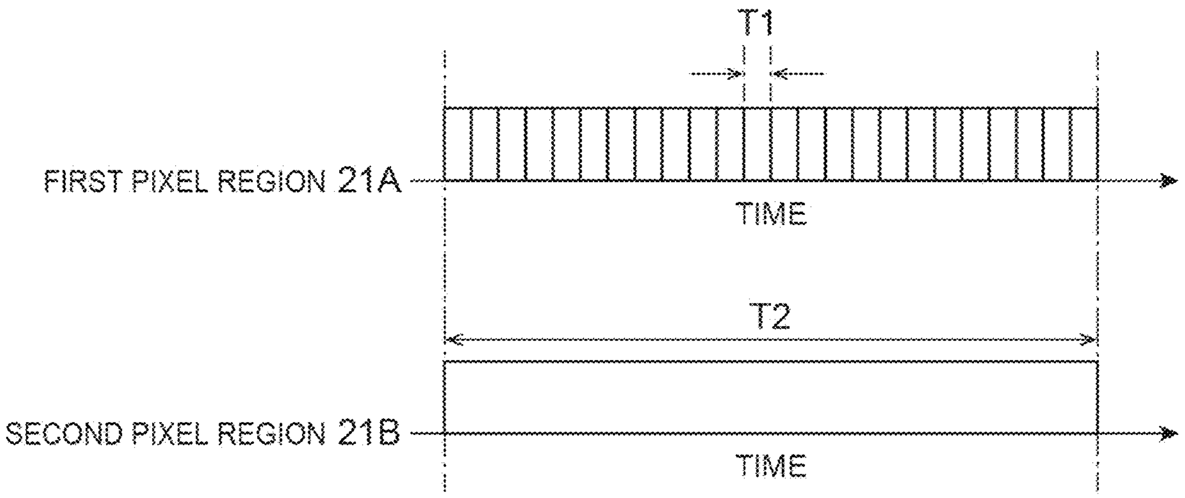
FIG. 3 is a schematic view illustrating a relationship between an exposure time of each pixel belonging to a first imaging region and an exposure time of each pixel belonging to a second imaging region.

In the present embodiment, a first exposure time T1 of each pixel 21 belonging to the first pixel region 21A and a second exposure time T2 of each pixel 21 belonging to the second pixel region 21B are different from each other. More specifically, as illustrated in FIG. 3, the first exposure time T1 of each pixel 21 belonging to the first pixel region 21A is shorter than the second exposure time T2 of each pixel 21 belonging to the second pixel region 21B. Therefore, image data of a plurality of frames is acquired in the first pixel region 21A during a period in which image data of one frame is acquired in the second pixel region 21B. In the generation unit 15, pixel values corresponding to the image data of the plurality of frames in the first pixel region 21A are integrated to generate image data based on the integrated pixel values. Note that, in the example of FIG. 3, the second exposure time T2 is an integral multiple of the first exposure time T1.

The specifying unit 14 and the generation unit 15 are physically configured by a computer system including a storage device such as a RAM or a ROM, a processor (arithmetic circuit) such as a CPU, a communication interface, and the like. The specifying unit 14 and the generation unit 15 may include a programmable logic controller (PLC), and may include a field-programmable gate array (FPGA).

The specifying unit 14 is a portion specifying, as a specific pixel 21K, the pixel 21 on which a spectroscopic spectrum image of the light L1 is formed among the plurality of pixels 21. Upon receiving the instruction information from the readout unit 13, the specifying unit 14 generates specific information indicating the specific pixel 21K and outputs the specific information to the generation unit 15. The specifying unit 14 may hold a specific pixel map M1 with respect to the pixel unit 11 as the specific information. The specific pixel map M1 can be acquired in advance by, for example, simulation data or actual measurement data in the case of guiding the light L1 or the Raman scattered light Lr to the spectroscopic optical system 4.

Figure 4:
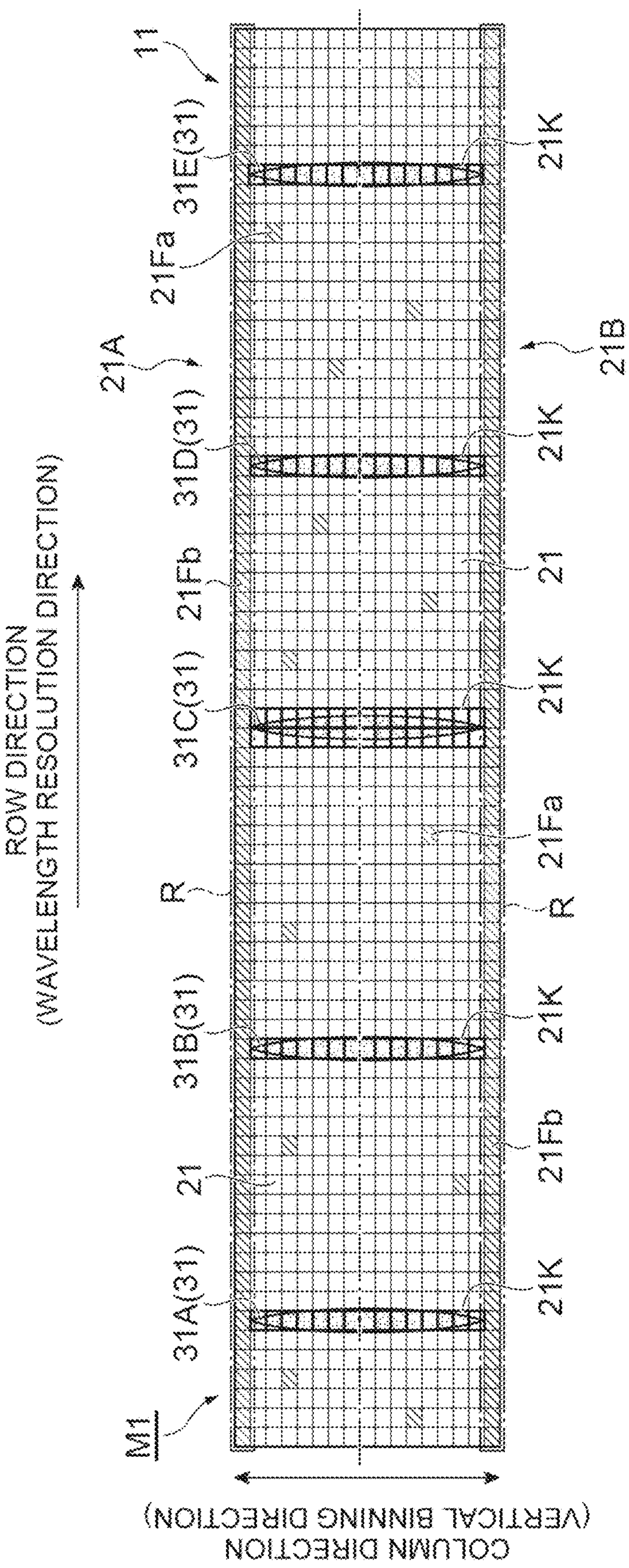
FIG. 4 is a schematic view illustrating an example of a specific pixel map.

FIG. 4 is a schematic view illustrating an example of a specific pixel map. In the example of FIG. 4, five wavelength-resolved spectroscopic spectrum images 31 (31A to 31E from the short wavelength side) are formed with respect to the horizontally long pixel unit 11 in which the number of pixels in the row direction is larger than the number of pixels in the column direction. Each of the spectroscopic spectrum images 31A to 31E linearly extends in the column direction of the pixel 21 and is formed on the pixel unit 11 in a state of being separated from each other in the row direction.

Figure 5:
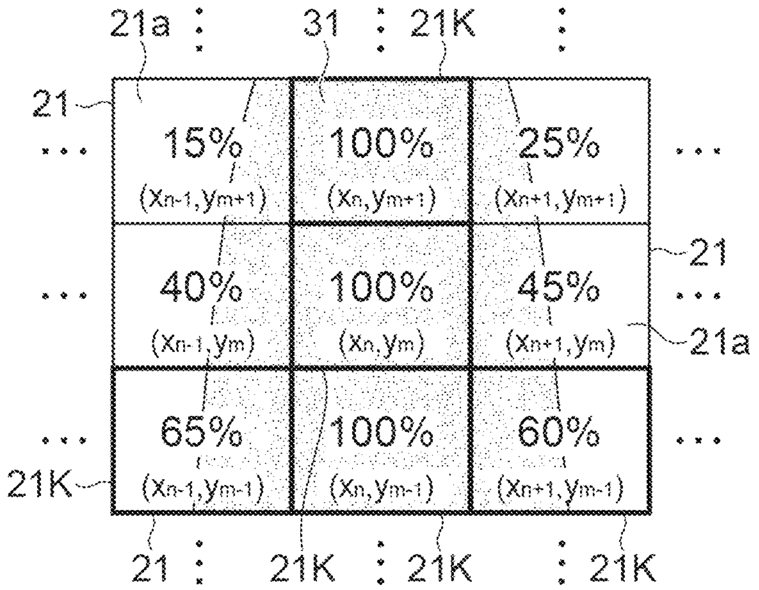
FIG. 5 is a schematic view illustrating details of the specific pixel map.

For such a spectroscopic spectrum image 31, in the specific pixel map M1, for example, the pixel 21 whose imaging area of the spectroscopic spectrum image 31 is 50% or more of an area of a light receiving surface is specified as the specific pixel 21K. In FIG. 5, arbitrary pixels 21 of 3 rows×3 columns in the specific pixel map M1 are illustrated, and the ratio of the imaging area of the spectroscopic spectrum image 31 to the area of the light receiving surface 21*a* of each pixel 21 is illustrated.

In the example of FIG. 5, each of the imaging areas of the spectroscopic spectrum image 31 in three pixels 21 of coordinates ($x_n$,$y_{m+1}$), coordinates ($x_n$,$y_m$), and coordinates ($x_n$,$y_{m-1}$) located at the center is 100% of the area of the light receiving surface 21*a*. The imaging areas of the spectroscopic spectrum image 31 in three pixels 21 of coordinates ($x_{n-1}$,$y_{m+1}$), coordinates ($x_{n-1}$,$y_m$), and coordinates ($x_{n-1}$, $y_{m-1}$) located on the left side are 15%, 40%, and 65%, respectively. The imaging areas of the spectroscopic spectrum image 31 in three pixels 21 of coordinates ($x_{n+1}$,$y_{m+1}$), coordinates ($x_{n+1}$,$y_m$), and coordinates ($x_{n+1}$,$y_{m-1}$) located on the right side are 15%, 40%, and 65%, respectively. Among these pixels 21, five pixels 21 of coordinates ($x_n$, $y_{m+1}$), coordinates ($x_n$,$y_m$), coordinates ($x_n$,$y_{m-1}$), coordinates ($x_{n-1}$,$y_{m-1}$), and coordinates ($x_{n+1}$,$y_{m-1}$) are candidates for the specific pixel 21K.

The specifying unit 14 excludes a pixel 21Fa whose readout noise exceeds a threshold is excluded from the specific pixel 21K. The specifying unit 14 may hold a readout noise map M2 with respect to the pixel unit 11. The readout noise map M2 is created, for example, by respectively measuring readout noise of each pixel 21 of the pixel unit 11 before the imaging sensor 10 is incorporated into the spectroscopic device 5. In the present embodiment, the readout noise map M2 is superimposed on and integrated with the specific pixel map M1 (see FIG. 4).

In the readout noise map M2, the threshold of the readout noise is set in a range of 0.1 [$e^-$rms] or more and 1.0 [$e^-$rms] or less. The specifying unit 14 excludes the pixel 21Fa whose readout noise exceeds 0.1 [$e^-$rms] from the candidates of the specific pixel 21K on the basis of the readout noise map M2. In the present embodiment, the threshold of the readout noise is set to 1.0 [$e^-$rms]. The threshold of the readout noise may be set to 0.5 [$e^-$rms], and may be set to 0.3 [$e^-$rms]. The threshold of the readout noise may be set in a range of 0.1 [$e^-$rms] or more and 0.3 [$e^-$rms] or less. In this case, the threshold of the readout noise may be set to 0.2 [$e^-$rms].

Figure 6:
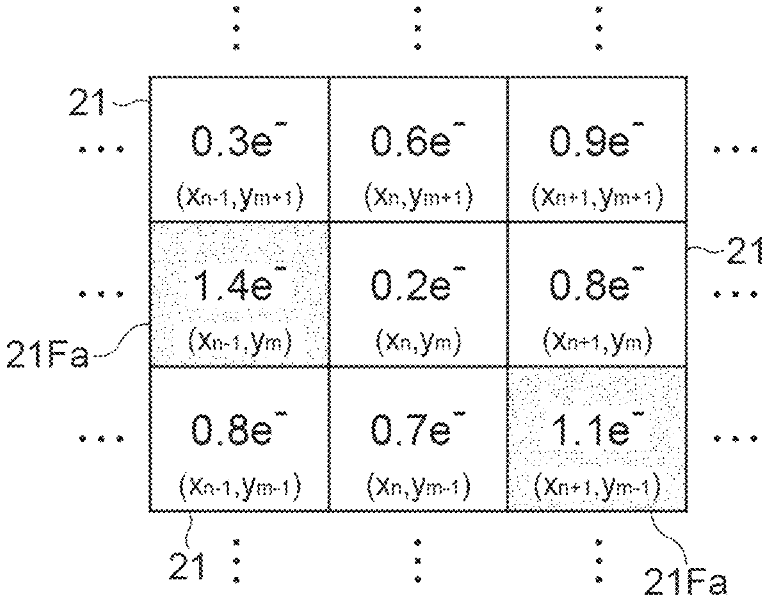
FIG. 6 is a schematic view illustrating details of a readout noise map.

In FIG. 6, the pixels 21 of 3 rows×3 columns illustrated in FIG. 5 are illustrated, and a value of readout noise of each pixel 21 is illustrated. In the example of FIG. 6, the readout noise of the pixel 21 of coordinates ($x_{n-1}$,$y_m$) and the readout noise of the pixel 21 of coordinates ($x_{n+1}$,$y_{m-1}$) are 1.4 [$e^-$rms] and 1.1 [$e^-$rms], respectively. When the threshold of the readout noise is set to 1.0 [$e^-$rms], these two pixels 21 are pixels 21Fa whose the value of the readout noise exceeds the threshold. The pixel 21 of coordinates ($x_{n+1}$,$y_{m-1}$) is a candidate for the specific pixel 21K in the example of FIG. 5, but is excluded from the candidates for the specific pixel 21K because it is the pixel 21Fa whose the readout noise exceeds the threshold. Therefore, in the range of the pixels 21 illustrated in FIG. 5 and FIG. 6, the four pixels 21 of coordinates ($x_n$,$y_{m+1}$), coordinates ($x_n$,$y_m$), coordinates ($x_n$, $y_{m-1}$), and coordinates ($x_{n-1}$,$y_{m-1}$) are finally specified as the specific pixel 21K.

The specifying unit 14 may hold in advance area information indicating an area where there is no input of the light L1 or the Raman scattered light Lr in the pixel unit 11, and may exclude the pixel 21 corresponding to the area information from the candidates for the specific pixel 21K. The area information is generated in advance on the basis of, for example, specifications or an arrangement mode of the spectroscopic element in the spectroscopic optical system 4. The area information may be superimposed on the specific pixel map M1. In the example of FIG. 4, the pixels 21 located at both ends of each column belong to an area R where there is no input of the light L1. A pixel 21Fb belonging to the area R is excluded from the candidates for the specific pixel 21K.

The generation unit 15 is a portion integrating pixel values of the specific pixels 21K belonging to the same column to generate spectroscopic spectrum data based on an integration result. The integration of the pixel values of the plurality of specific pixels 21K belonging to the same column is processing corresponding to so-called vertical binning. The spectroscopic spectrum data may be a two-dimensional image representing the pixel value of each specific pixel 21K, or may be a histogram obtained by plotting the pixel values. The generation unit 15 outputs the generated spectroscopic spectrum data to the computer 6 (analysis unit 8).

In the present embodiment, as described above, the pixel unit 11 is divided into the first pixel region 21A and the second pixel region 21B. Furthermore, the first exposure time T1 of each pixel 21 belonging to the first pixel region 21A is shorter than the second exposure time T2 of each pixel 21 belonging to the second pixel region 21B (see FIG. 2 and FIG. 3). The generation unit 15 generates first spectroscopic spectrum data obtained by integrating pixel values of the specific pixels 21K belonging to the same column in the first pixel region 21A and second spectroscopic spectrum data obtained by integrating pixel values of the specific pixels 21K belonging to the same column in the second pixel region 21B.

The first spectroscopic spectrum data is acquired at the relatively short first exposure time T1 in the first pixel region 21A, and is, for example, equal to or less than a saturation level in all wavelength bands. The second spectroscopic spectrum data is acquired at the relatively long second exposure time T2 in the second pixel region 21B, and is equal to or more than a saturation level in a certain wavelength band.

The generation unit 15 divides the wavelength band of the entire spectrum into a saturation wavelength band and a non-saturation wavelength band of the second spectroscopic spectrum data. In the saturation wavelength band, the second spectroscopic spectrum data is equal to or more than the saturation level, and the first spectroscopic spectrum data is less than the saturation level. In the non-saturation wavelength band, the second spectroscopic spectrum data is less than the saturation level and has more favorable S/N ratio than the first spectroscopic spectrum data. The generation unit 15 combines the first spectroscopic spectrum data in the saturation wavelength band and the second spectroscopic spectrum data in the non-saturation wavelength band to generate spectroscopic spectrum data to be output to the computer 6.

Figure 7:
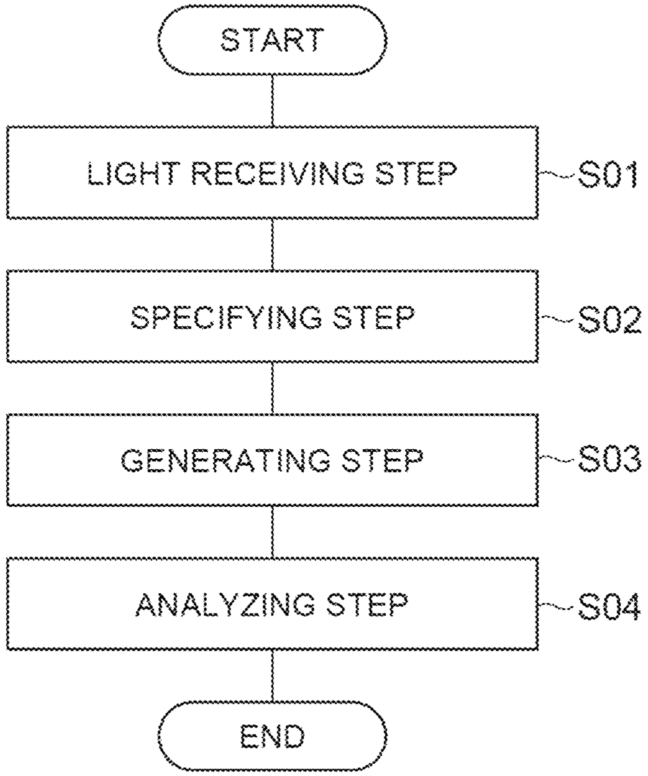
FIG. 7 is a flowchart illustrating a spectroscopic method according to an embodiment of the present disclosure.

FIG. 7 is a flowchart illustrating a spectroscopic method according to an embodiment of the present disclosure. This spectroscopic method is a method of receiving light wavelength-resolved in a predetermined direction to acquire spectroscopic spectrum data of the light. The spectroscopic method according to the present embodiment is performed using the spectroscopic device 5 described above. As illustrated in FIG. 7, this spectroscopic method includes a light receiving step (step S01), a specifying step (step S02), a generating step (step S03), and an analyzing step (step S4).

In the light receiving step S01, the imaging sensor 10 (CMOS image sensor) is used, and the wavelength-resolved light L1 or the Raman scattered light Lr is received by the plurality of pixels 21 arranged in the row direction along the wavelength resolution direction and in the column direction perpendicular to the row direction and converted into an electrical signal. In the present embodiment, the light L1 or the Raman scattered light Lr is received in different exposure periods in the first pixel region 21A and the second pixel region 21B. Then, the pixel value of each pixel 21 belonging to the first pixel region 21A and the pixel value of each pixel 21 belonging to the second pixel region 21B each are output to the generation unit 15.

In the specifying step S02, the pixel 21 on which the spectroscopic spectrum image 31 of the light L1 or the Raman scattered light Lr is formed is specified as the specific pixel 21K among the plurality of pixels 21. In the present embodiment, the specifying unit 14 holds the specific pixel map M1 in advance, and specifies, as the specific pixel 21K, the pixel 21 whose imaging area of the spectroscopic spectrum image 31 is 50% or more of the area of the light receiving surface 21*a*. In the present embodiment, the pixel 21Fa whose readout noise exceeds 1.0 [$e^-$rms] which is the threshold is excluded from the specific pixel 21K.

In the generating step S03, pixel values of the specific pixels 21K belonging to the same column are integrated to generate spectroscopic spectrum data based on an integration result. In the present embodiment, in the generation unit 15, the first spectroscopic spectrum data obtained by integrating pixel values of the specific pixels 21K belonging to the same column in the first pixel region 21A and the second spectroscopic spectrum data obtained by integrating pixel values of the specific pixels 21K belonging to the same column in the second pixel region 21B are generated. Further, the first spectrum data in the saturation wavelength band and the second spectrum data in the non-saturation wavelength band are combined to generate spectroscopic spectrum data to be output to the computer 6.

In the analyzing step S04, the sample S is analyzed on the basis of the spectroscopic spectrum data generated in the generating step S03. For example, the waveform, peak position, half-value width, and the like of the spectroscopic spectrum are analyzed to evaluate various physical properties such as the molecular structure, crystallinity, orientation, and distortion amount of the sample S.

As described above, in the spectroscopic device 5, the pixel 21 on which the spectroscopic spectrum image 31 of the wavelength-resolved light L1 is formed is specified as the specific pixel 21K, and pixel values of the specific pixels 21K belonging to the same column are integrated to generate spectroscopic spectrum data. By excluding other pixels 21 on which the spectroscopic spectrum image 31 is not formed from the integration of the pixel values, the influence of the readout noise when the pixel values are integrated can be sufficiently reduced. Therefore, in the spectroscopic device 5, the spectroscopic spectrum data can be acquired with an excellent SN ratio.

In the spectroscopic device 5, the pixel 21Fa whose readout noise exceeds a threshold is excluded from the specific pixel 21K. Furthermore, the threshold of the readout noise may be set in a range of 0.1 [$e^-$rms] or more and 1.0 [$e^-$rms] or less. Thereby, the influence of the readout noise when the pixel values are integrated can be more sufficiently reduced. Therefore, the SN ratio of the spectroscopic spectrum data can be further improved.

In the spectroscopic device 5, the pixel 21 whose imaging area of the spectroscopic spectrum image 31 is 50% or more of the area of the light receiving surface 21*a* is specified as the specific pixel 21K. By excluding the pixel 21 having a small contribution to acquisition of the spectroscopic spectrum image 31 from the specific pixel 21K, the influence of the readout noise when the pixel values are integrated can be more sufficiently reduced. Therefore, the SN ratio of the spectroscopic spectrum data can be further improved.

In the spectroscopic device 5, the pixel unit 11 includes the first pixel region 21A and the second pixel region 21B divided in the column direction, the first readout unit 13A reading each pixel 21 belonging to the first pixel region 21A, and the second readout unit 13B reading each pixel 21 belonging to the second pixel region 21B. With such a configuration, the first pixel region 21A and the second pixel region 21B can be selectively used according to the mode of the spectroscopic spectrum image. Therefore, spectroscopic spectrum data of various types of light can be acquired with a favorable SN ratio.

In the spectroscopic device 5, the first exposure time T1 of each pixel 21 belonging to the first pixel region 21A is shorter than the second exposure time T2 of each pixel 21 belonging to the second pixel region 21B. According to this configuration, for example, spectroscopic spectrum images 31 of light L1 having different intensities depending on wavelengths can be acquired in different exposure times in the first pixel region 21A and the second pixel region 21B. In the present embodiment, a saturation wavelength band of spectroscopic spectrum data acquired with the relatively short first exposure time T1 in the first pixel region 21A and a non-saturation wavelength band of spectroscopic spectrum data acquired with the relatively long second exposure time T2 in the second pixel region 21B are combined to generate final spectroscopic spectrum data. Thereby, spectroscopic spectrum data with a favorable SN ratio can be acquired in a high dynamic range.

In the spectroscopic device 5, the second exposure time T2 is longer than the first exposure time T1, and image data of a plurality of frames is acquired in the first pixel region 21A during a period in which image data of one frame is acquired in the second pixel region 21B. Thereby, even in the case of setting different exposure times for the first pixel region 21A and the second pixel region 21B, the readout noise of the specific pixels 21K in each column can be made uniform between the first pixel region 21A and the second pixel region 21B. Therefore, the SN ratio of the spectroscopic spectrum data can be stably improved.

In the Raman spectroscopic measurement device 1 configured by incorporating the spectroscopic device 5 described above, the pixel 21 on which the spectroscopic spectrum image 31 of the wavelength-resolved Raman scattered light Lr is formed is specified as the specific pixel 21K, and pixel values of the specific pixels 21K belonging to the same column are integrated to generate spectroscopic spectrum data. By excluding other pixels 21 on which the spectroscopic spectrum image 31 is not formed from the integration of the pixel values, the influence of the readout noise when the pixel values are integrated can be sufficiently reduced. Therefore, in the Raman spectroscopic measurement device 1, the spectroscopic spectrum data can be acquired with an excellent SN ratio.

The present disclosure is not limited to the above embodiment, and various modifications can be applied. As described above, the spectroscopic optical system 4 includes a spectroscopic element dispersing the light L1 or the Raman scattered light Lr in the wavelength resolution direction. However, it is assumed that the spectroscopic spectrum image actually formed on the pixel unit 11 through the spectroscopic optical system 4 is not linear due to the influence of aberration of the optical system as represented by, for example, Czerny-Turner type spectroscopy.

Figure 8:
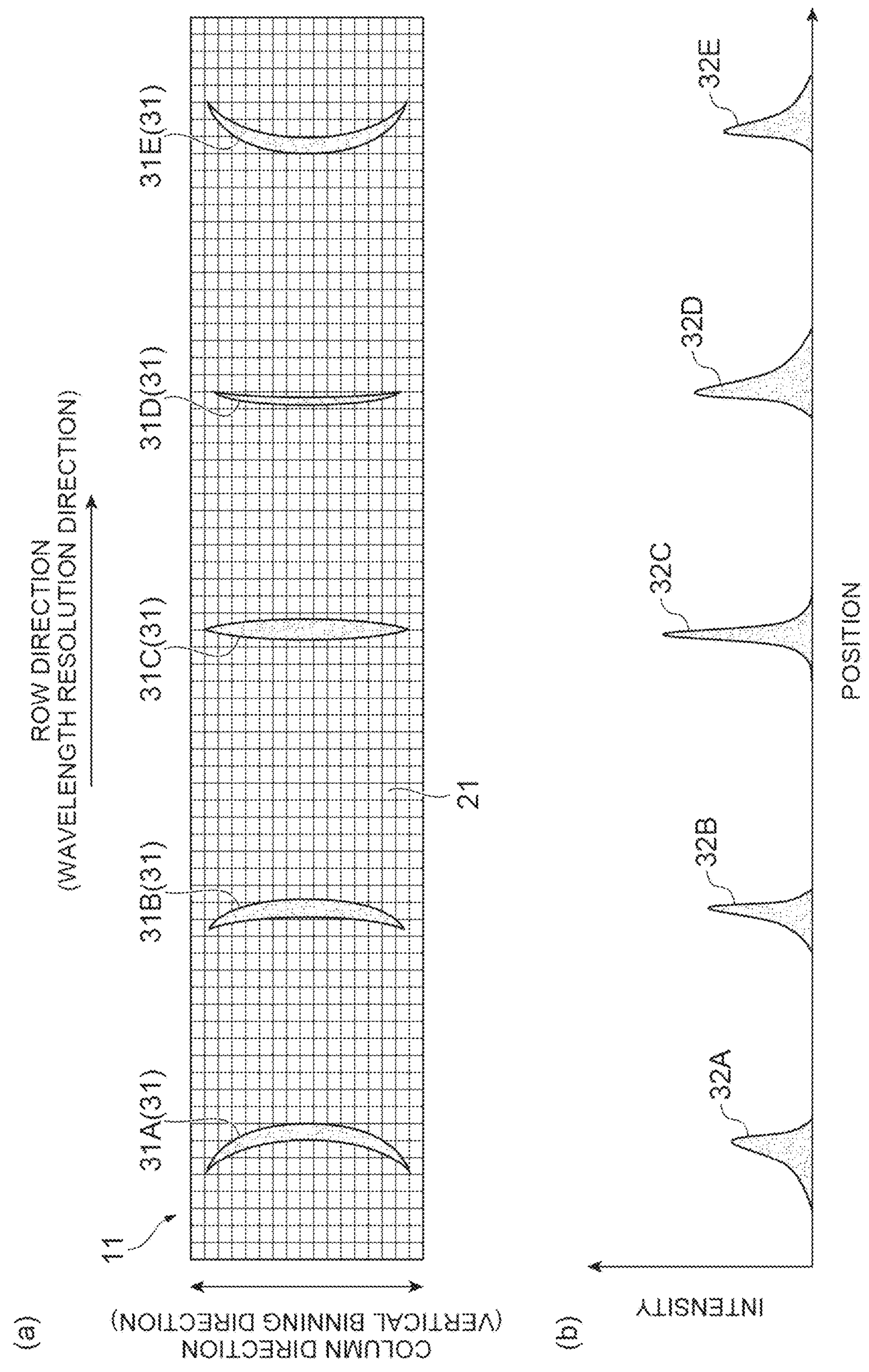
FIG. 8(*a*) is a schematic view illustrating an example of a spectroscopic spectrum image having aberration, and FIG. 8(*b*) is a schematic view illustrating an example of spectroscopic spectrum data obtained on the basis of the spectroscopic spectrum image illustrated in FIG. 8(*a*).

For example, in the example of FIG. 8(*a*), the spectroscopic spectrum image 31C located at the center of the pixel unit 11 has a linear shape in the column direction (vertical binning direction), but in each of the spectroscopic spectrum images 31A and 31B and the spectroscopic spectrum images 31D and 31E, a so-called pincushion distortion occurs in which the image is curved toward the center side of the pixel unit 11. The distortion amount of the spectroscopic spectrum image 31 increases as the spectroscopic spectrum image is farther from the center of the pixel unit 11. The distortion amount of the spectroscopic spectrum images 31A and 31E is larger than the distortion amount of the spectroscopic spectrum images 31B and 31D.

When vertical binning of the pixel value of the specific pixel 21K of each column is performed in a state where such distortion occurs, as illustrated in FIG. 8(*b*), there is a concern that the wavelength resolution in the row direction decreases according to the degree of distortion in spectroscopic spectrum data items 32A, 32B, 32D, and 32E based on the spectroscopic spectrum images 31A, 31B, 31D, and 31E excluding the spectroscopic spectrum image 31C among spectroscopic spectrum data items 32A to 32E based on the spectroscopic spectrum images 31A to 31E. Furthermore, peak values of the spectroscopic spectrum data items 32A, 32B, 32D, and 32E decrease, which may cause a problem in that the SN ratio decreases.

Figure 9:
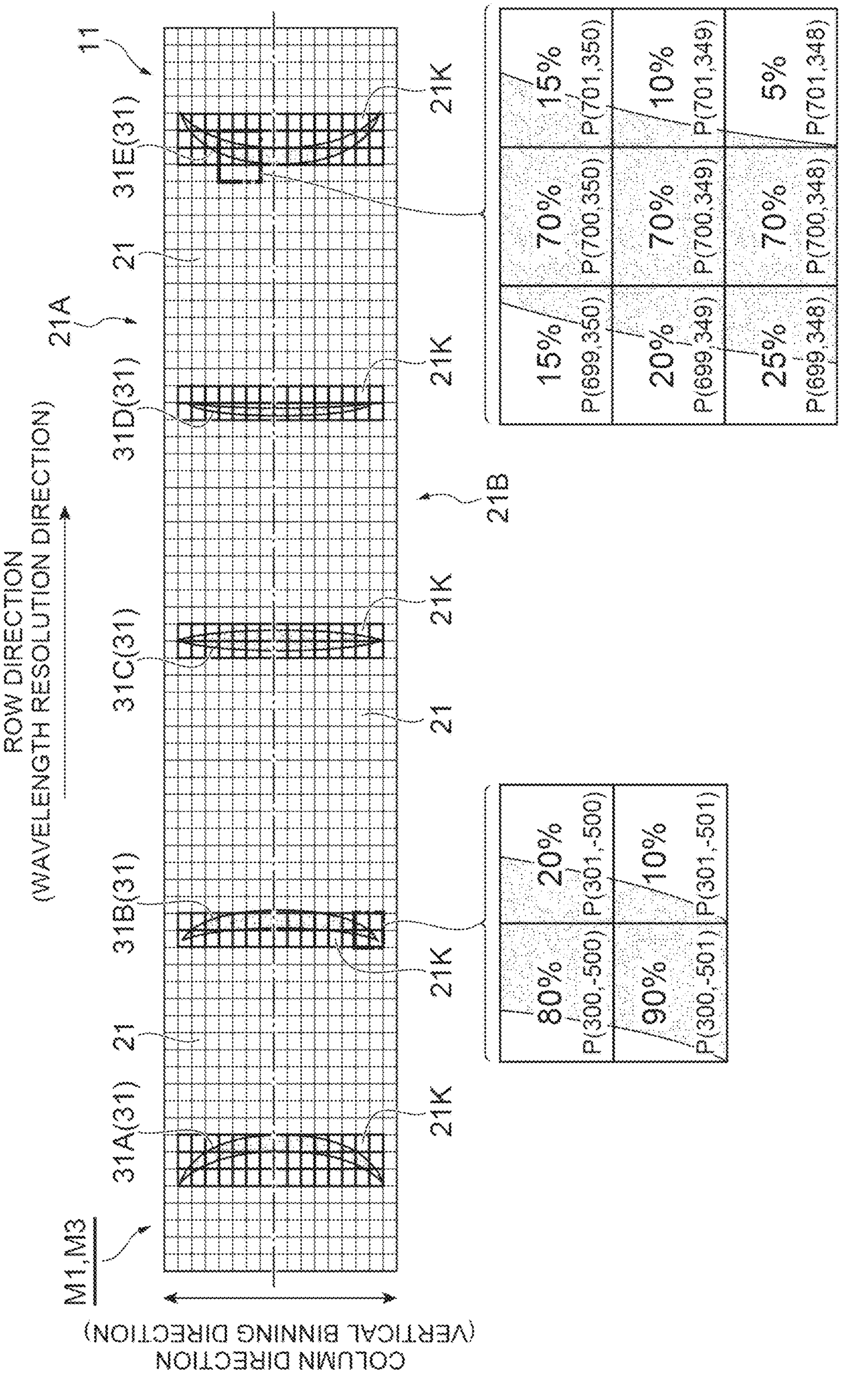
FIG. 9 is a schematic view illustrating an example of an integration ratio map.

With respect to such a problem, the specifying unit 14 may specify an integration ratio of the specific pixels 21K to be used for integration of the number of pixels on the basis of aberration information of the light L1 and the Raman scattered light Lr in the spectroscopic optical system 4, and the generation unit 15 may integrate the pixel values of the specific pixels 21K by using the integration ratio. Specifically, as illustrated in FIG. 9, the specifying unit 14 may have an integration ratio map M3 with respect to the pixel unit 11. In the example of FIG. 9, the integration ratio map M3 is superimposed on and integrated with the specific pixel map M1. The aberration information to be used for generating the integration ratio map M3 can be acquired in advance by simulation data or actual measurement data in the case of guiding the light L1 or the Raman scattered light Lr to the spectroscopic optical system 4. In the case of using actual measurement data, aberration information can be acquired on the basis of spectroscopic spectrum data of a plurality of optical images on the premise that there is no local distortion.

The specifying unit 14 may refer to the integration ratio map M3 and perform subpixel processing based on the integration ratio of the plurality of specific pixels 21K adjacent in the row direction at the time of vertical binning of the pixel value. FIG. 9 illustrates an extraction of the integration ratio of a part of the specific pixels 21K corresponding to the spectroscopic spectrum image 31B and the spectroscopic spectrum image 31E in the integration ratio map M of the entire pixel unit 11. As described above, the distortion of the spectroscopic spectrum image 31E is larger than the distortion of the spectroscopic spectrum image 31B. Therefore, in the example of FIG. 9, in the vertical binning of the pixel value of the specific pixel 21K corresponding to the spectroscopic spectrum image 31B, subpixel processing based on the integration ratio of the two specific pixels 21K adjacent in the row direction is performed. Furthermore, in the vertical binning of the pixel 21 corresponding to the spectroscopic spectrum image 31E, subpixel processing based on the integration ratio of the three specific pixels 21K adjacent in the row direction is performed.

In the example of FIG. 9, the pixel value of the specific pixel 21K of coordinates (x,y) is P(x,y). Assuming that the reference of the x coordinate of the specific pixel 21K corresponding to the spectroscopic spectrum image 31B is 300 and the y coordinate is −512 to +512, vertical binning of the pixel value of the specific pixel 21K corresponding to the spectroscopic spectrum image 31B is expressed by the following Formula (1). Assuming that the reference of the x coordinate of the specific pixel 21K corresponding to the spectroscopic spectrum image 31E is 700 and the y coordinate is −512 to +512, vertical binning of the pixel value of the specific pixel 21K corresponding to the spectroscopic spectrum image 31E is expressed by the following Formula (2).

[Mathematical Formula 1]

$$\sum_{k=511}^{512} \alpha(300, k) = \alpha(300, -511) + \ldots + \alpha(300, 512) \quad (1)$$

[Mathematical formula 2]

$$\sum_{k=511}^{512} \beta(700, k) = \beta(700, -511) + \ldots + \beta(700, 512) \quad (2)$$

In FIG. 9, as a part of the specific pixel 21K corresponding to the spectroscopic spectrum image 31B, four pixels of coordinates (300,−500), coordinates (301,−500), coordinates (300,−501), and coordinates (301,−501) are illustrated. For these four pixels, the integration ratio of P(300,−500) is 80%, the integration ratio of P(301,−500) is 20%, the integration ratio of P(300,−501) is 90%, and the integration ratio of P(301,−501) is 10%. Therefore, in Formula (1), a (300,−500) is obtained by the following Formula (3), and a (300,−501) is obtained by the following Formula (4).

$$\alpha(300, -500) = (80 \times P(300, -500) + 20 \times P(301, -500))/100 \quad (3)$$

$$\alpha(300, -501) = (90 \times P(300, -501) + 10 \times P(301, -501))/100 \quad (4)$$

Furthermore, in FIG. 9, nine pixels of coordinates (699, 350), coordinates (700,350), coordinates (701,350), coordinates (699,349), coordinates (700,349), coordinates (701, 349), coordinates (699,348), coordinates (700,348), and coordinates (701,348) are illustrated as a part of the specific pixel 21K corresponding to the spectroscopic spectrum image 31E. For these nine pixels, the integration ratio of P(699,350) is 15%, the integration ratio of P(700,350) is 70%, the integration ratio of P(701,350) is 15%, the integration ratio of P(699,349) is 20%, the integration ratio of P(700,349) is 70%, the integration ratio of P(701,349) is 10%, the integration ratio of P(699,348) is 25%, the integration ratio of P(700,348) is 70%, and the integration ratio of P(701,348) is 5%.

Therefore, in Formula (2), β(700,350) is obtained by the following Formula (5), and β(700,349) is obtained by the following Formula (6). Furthermore, β700,348) is obtained by the following Formula (7).

$$\beta(700,350)=(15\times P(699,350)+70\times P(700,350)+15\times P(701,350)) \quad (5)$$

$$\beta(700,349)=(20\times P(699,349)+70\times P(700,349)+10\times P(701,349)) \quad (6)$$

$$\beta(700,348)=(25\times P(699,348)+70\times P(700,348)+5\times P(701,348)) \quad (7)$$

Figure 10:
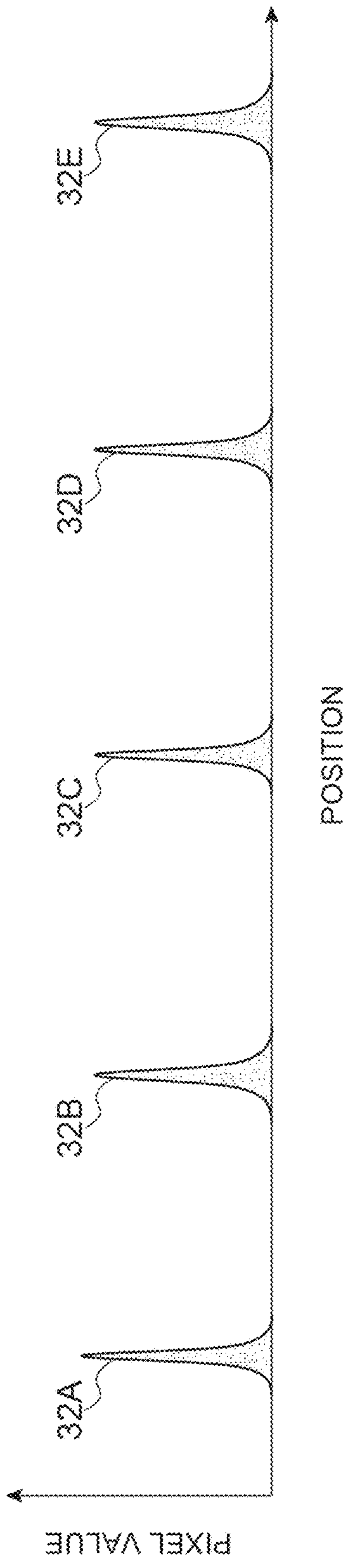
FIG. 10 is a schematic graph showing spectroscopic spectrum data obtained by vertical binning using the integration ratio map.

FIG. 10 is a schematic graph showing spectroscopic spectrum data obtained by vertical binning using the integration ratio map. As shown in FIG. 10, by integrating the number of pixels of the specific pixel 21K using the integration ratio based on the aberration information of the light L1 or the Raman scattered light Lr, even when distortion occurs in the spectroscopic spectrum images 31A to 31E, a decrease in wavelength resolution in the row direction can be suppressed in each of spectroscopic spectrum data items 32A to 32E based on the spectroscopic spectrum images 31A to 31E. Furthermore, a decrease in peak value is also suppressed, and the SN ratio is also improved.

Note that, in the example of FIG. 9, only the integration ratio map M3 is illustrated, but the above-described readout noise map M2 may be superimposed on the integration ratio map M3. Furthermore, area information may be further superimposed on the integration ratio map M3. In this case, the generation unit 15 excludes the pixel 21 specified by the readout noise map M2 and the area information from the specific pixel 21K, and then performs vertical binning by subpixel processing using the integration ratio map M3.

In the above embodiment, the first exposure time T1 of each pixel 21 belonging to the first pixel region 21A is shorter than the second exposure time T2 of each pixel 21 belonging to the second pixel region 21B, but a common exposure time may be set between the first pixel region 21A and the second pixel region 21B. In the case of setting a common exposure time, in the pixel unit 11, the saturation charge amount of each pixel 21 belonging to the first pixel region 21A and the saturation charge amount of each pixel 21 belonging to the second pixel region 21B may be different from each other.

Figure 11:
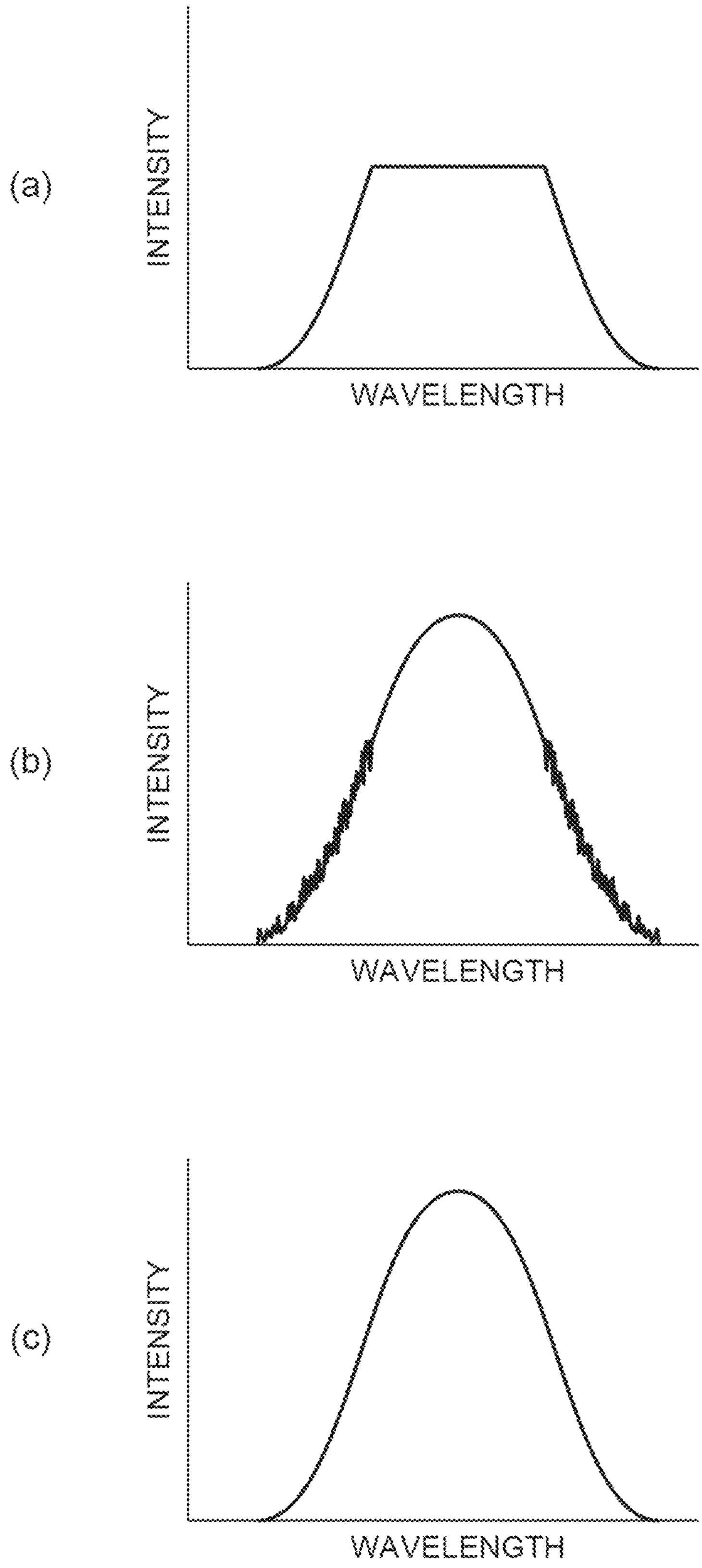
FIGS. 11(*a*) to 11(*c*) are schematic graphs showing states of generation of spectroscopic spectrum data in a modification.

For example, when the saturation charge amount of each pixel 21 belonging to the first pixel region 21A is made relatively small, the readout noise of these pixels 21 also becomes relatively small. In the first spectroscopic spectrum data obtained by integrating pixel values of the specific pixels 21K belonging to the same column in the first pixel region 21A, as shown in FIG. 11(*a*), the SN ratio is favorable as a whole, but a wavelength band having an intensity equal to or higher than a predetermined intensity is a saturation wavelength band.

On the other hand, when the saturation charge amount of each pixel 21 belonging to the second pixel region 21B is made relatively large, the readout noise of these pixels 21 also becomes relatively large. In the second spectroscopic spectrum data obtained by integrating pixel values of the specific pixels 21K belonging to the same column in the second pixel region 21B, as shown in FIG. 11(*b*), the entire spectrum is in a non-saturation wavelength band, but the SN ratio decreases in a wavelength band having an intensity equal to or less than a predetermined intensity.

In this case, the generation unit 15 divides the wavelength band of the entire spectrum into a saturation wavelength band and a non-saturation wavelength band of the first spectrum data. As shown in FIG. 11(*c*), the generation unit 15 combines the first spectrum data in the non-saturation wavelength band and the second spectrum data in the saturation wavelength band to generate spectroscopic spectrum data to be output to the computer 6. According to such a configuration, spectroscopic spectrum data with a favorable SN ratio can be acquired in a high dynamic range while the first exposure time T1 of each pixel 21 belonging to the first pixel region 21A and the second exposure time T2 of each pixel 21 belonging to the second pixel region 21B are kept equal to each other.

Figure 12:
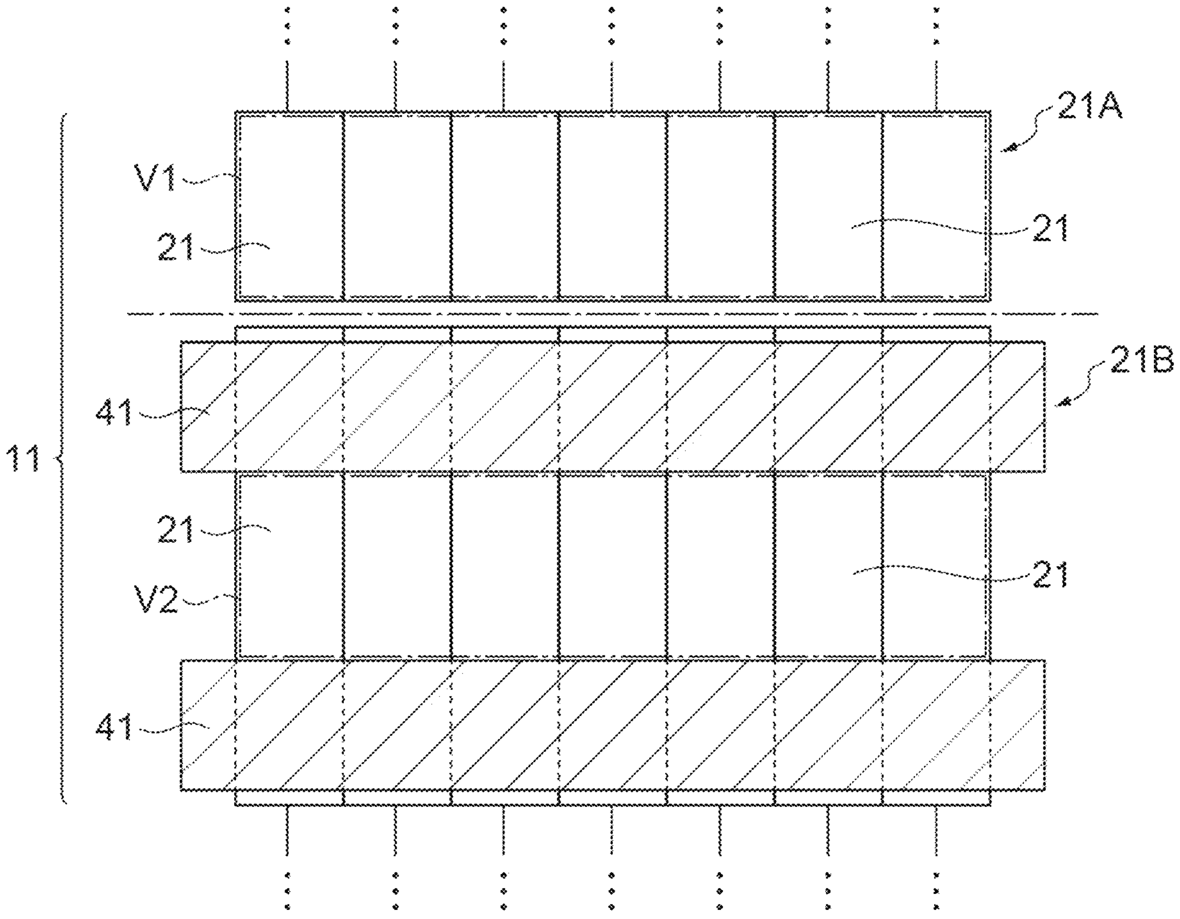
FIG. 12 is a schematic view illustrating a modification of a pixel unit.

When it is desired to increase a difference between the saturation charge amount of the first pixel region 21A and the saturation charge amount of the second pixel region 21B in order to expand the dynamic range, it is conceivable that a size difference between the light receiving area of the first pixel region 21A and the light receiving area of the second pixel region 21B increases due to the configuration of the imaging sensor 10. In this case, as illustrated in FIG. 12, in the pixel unit 11, a mask 41 making an area of a light receiving area V1 of the first pixel region 21A equal to an area of a light receiving area V2 of the second pixel region 21B may be provided.

The arrangement of such a mask 41 makes it possible to equalize the amount of light received per unit time between the first pixel region and the second pixel region. Thereby, spectroscopic spectrum data with a favorable SN ratio can be acquired in a higher dynamic range while the exposure time T1 of each pixel 21 belonging to the first pixel region 21A and the exposure time T2 of each pixel 21 belonging to the second pixel region 21B are kept equal to each other.

As another modification, the pixel unit 11 may not be necessarily divided into the first pixel region 21A and the second pixel region 21B, and may be configured by one pixel region. The spectroscopic device 5 is not limited to be applied to the Raman spectroscopic measurement device 1, and may be applied to other spectroscopic measurement devices such as a fluorescence spectroscopic measurement device, a plasma spectroscopic measurement device, and an emission spectroscopic measurement device. Furthermore, the spectroscopic device 5 may be applied to other spectroscopic measurement devices such as a film thickness measurement device, optical density measurement, laser-induced breakdown spectroscopy (LIBS) measurement, and differential optical absorption spectroscopy (DOAS) measurement.

REFERENCE SIGNS LIST

1 Raman spectroscopic measurement device
2 light source unit
3 light guiding optical system
4 spectroscopic optical system
5 spectroscopic device
8 analysis unit
10 imaging sensor (CMOS image sensor)
11 pixel unit
13A first readout unit
13B second readout unit
14 specifying unit
15 generation unit
21 pixel
21*a* light receiving surface
21A first pixel region
21B second pixel region
21K specific pixel
31 (31A to 31E) spectroscopic spectrum image

41 mask

L1 light

Lr Raman scattered light

T1 first exposure time

T2 second exposure time

V1 light receiving area of first pixel region

V2 light receiving area of second pixel region

The invention claimed is:

1. A spectroscopic device receiving light wavelength-resolved in a predetermined direction by a spectroscopic optical system including a spectroscopic element to acquire spectroscopic spectrum data of the light, the spectroscopic device comprising:

a CMOS image sensor including a pixel unit including a plurality of pixels receiving the wavelength-resolved light to convert the light into an electrical signal, and the plurality of pixels being arranged in a row direction along a wavelength resolution direction and in a column direction perpendicular to the row direction;

a specifying unit specifying, as a specific pixel, a pixel on which a spectroscopic spectrum image of the light is formed among the plurality of pixels; and a generation unit integrating pixel values of the specific pixels belonging to the same column to generate spectroscopic spectrum data based on an integration result, wherein the specifying unit and the generation unit are configured by a computer system, the specifying unit specifies an integration ratio of the specific pixels on the basis of aberration information of the light, and the generation unit integrates the pixel values of the specific pixels by using the integration ratio.

2. The spectroscopic device according to claim 1, wherein the specifying unit excludes a pixel whose readout noise exceeds a threshold from the specific pixel.

3. The spectroscopic device according to claim 2, wherein the threshold of the readout noise is set in a range of 0.1 [$e^{-}$rms] or more and 1.0 [$e^{-}$rms] or less.

4. The spectroscopic device according to claim 1, wherein the specifying unit specifies, as the specific pixel, a pixel whose imaging area of the spectroscopic spectrum image is 50% or more of an area of a light receiving surface.

5. The spectroscopic device according to claim 1, wherein the pixel unit includes:

a first pixel region and a second pixel region divided in the column direction;

a first readout unit reading each pixel belonging to the first pixel region; and a second readout unit reading each pixel belonging to the second pixel region.

6. The spectroscopic device according to claim 5, wherein a first exposure time of each pixel belonging to the first pixel region is shorter than a second exposure time of each pixel belonging to the second pixel region.

7. The spectroscopic device according to claim 6, wherein image data of a plurality of frames is acquired in the first pixel region during a period in which image data of one frame is acquired in the second pixel region.

8. The spectroscopic device according to claim 5, wherein a saturation charge amount of each pixel belonging to the first pixel region and a saturation charge amount of each pixel belonging to the second pixel region are different from each other.

9. The spectroscopic device according to claim 8, wherein the pixel unit includes a mask making an area of a light receiving area of the first pixel region equal to an area of a light receiving area of the second pixel region.

10. The spectroscopic device according to claim 1, wherein the computer system comprises an analysis unit analyzing the spectroscopic spectrum data.

11. The spectroscopic device according to claim 1, further comprising the spectroscopic optical system including the spectroscopic element.

12. A Raman spectroscopic measurement device comprising:

the spectroscopic device according to claim 1;

a light source unit generating light with which a sample is irradiated; and a light guiding optical system guiding Raman scattered light generated by irradiating the sample with the light to the spectroscopic device.

13. A spectroscopic method of receiving light wavelength-resolved in a predetermined direction to acquire spectroscopic spectrum data of the light, the spectroscopic method comprising:

receiving, by using a CMOS image sensor, the wavelength-resolved light by a plurality of pixels arranged in a row direction along a wavelength resolution direction and in a column direction perpendicular to the row direction to convert the light into an electrical signal;

specifying, as a specific pixel, a pixel on which a spectroscopic spectrum image of the light is formed among the plurality of pixels; and integrating pixel values of the specific pixels belonging to the same column to generate spectroscopic spectrum data based on an integration result, wherein the specifying specifies an integration ratio of the specific pixels on the basis of aberration information of the light, and the integrating integrates the pixel values of the specific pixels by using the integration ratio.

* * * * *